Patented Feb. 21, 1933

1,898,965

UNITED STATES PATENT OFFICE

ADOLF SPILKER AND CARL ZERBE, OF DUISBURG-MEIDERICH, GERMANY, ASSIGNORS TO GESELLSCHAFT FUR TEERVERWERTUNG, M. B. H., OF DUISBURG-MEIDERICH, GERMANY

PROCESS FOR HYDROGENATING ORGANIC SUBSTANCES

No Drawing. Application filed September 16, 1927, Serial No. 220,057, and in Germany September 23, 1926.

It is known that hydrogen iodide parts with hydrogen at elevated temperatures, and thereby acts as a powerful reducing agent. Phosphorous is frequently added in this method of reduction, in order to reconvert the liberated iodine into hydrogen iodide in the presence of water and thus bring it into action again.

We have found that under high pressure, suitably high temperature and in the presence of even very small quantities of iodine, hydrogen itself enters with surprising readiness into additive combination with organic substances, such as coals and their distillation products and especially hydrocarbons, and also with the other constituents of tars, including, for example, pitch, and thereby extensively hydrogenates and more or less splits up said substances.

Instead of, or as well as iodine, certain compounds of iodine,—e. g. hydrogen iodide or ferrous iodide,—which readily part with iodine or hydrogen iodide at the temperature of the reaction, can be used.

Iodine compounds which do not by themselves dissociate or only do so with difficulty at the reaction temperature and prevailing working conditions can be used in conjunction with suitable compounds which react with the said iodine compounds under the specified conditions and either liberate iodine itself or form iodine compounds, which are readily dissociated. Such compounds comprise more particularly metallic salts, such as iron alum, ferric chloride, copper sulphate or other metallic salts which liberate iodine or hydrogen iodide even from alkali iodides or alkaline earth iodides and allow them to come into intensive action.

We have further found that the other halogens and halogen compounds also act in the same manner as iodine, though to a smaller extent and at higher temperatures. A remarkably efficient action is obtained more particularly when several halogens or their compounds are employed in conjunction. In this case also, an addition of suitable metallic salts facilitates the dissociations of the halogen compounds and is extraordinarily efficacious. In place of the arbitrarily prepared mixture of halogen compounds, use can also be made, with great advantage, of crude mixtures, such as occur in nature, or in the form of mother liquors in the potash industry, or as intermediate products in the production of bromine and iodine from algæ and sea weeds.

The reaction proceeds so rapidly at temperatures between 200 and 500° C. and over, with a hydrogen pressure of 50–200 or more atmospheres, that, the reaction temperature remaining constant, the pressure in the pressure vessel decreases to a noticeable extent.

A particularly noteworthy point, and one of technically economic value is that only small quantities of iodine or halogen or their compounds are needed to reduce very large amounts of the substance under treatment; and that in the method according to this invention, impurities, such as sulphur or other contact poisons, in the substances to be reduced, or in the hydrogen, have no injurious effect.

The invention is illustrated by the following examples.

(1). 10 kilos of drained crude naphthalene are treated with about 1 gram or less, of iodine in an iron pressure vessel, fitted with stirrers and adapted to stand a pressure of at least 200 atmospheres. Hydrogen, which need not be pure, is then admitted under pressure of 50–100 atmospheres, and the whole is heated to 300–500° C. The pressure, which increased at the outset owing to the rising temperature, very soon begins to sink at about 380° C. (constant temperature), an indication that hydrogen has been absorbed. If the quantity of hydrogen employed has been insufficient to complete the reaction, a further amount of hydrogen can be forced in after cooling, and the reaction carried further, or to completion, by renewed heating.

According to the temperature employed, the product is a mixture of low-boiling benzol hydrocarbons and tetralin, which may also contain decalin and other hydrocarbons according to the method of conducting the operation.

In this manner and under suitable working conditions, there can be obtained from the 10 kilos of crude naphthalene up to 8 kilos and more of liquid hydrocarbons boiling up to 200° C. The unaltered naphthalene, which can be separated by distillation, can be used again. Impurities, such as phenols, bases, thionaphthene and the like, in the naphthalene, give no more trouble than any impurities present in the hydrogen, and are themselves more or less completely reduced.

(2). 10 kilos of ordinary coal-tar pitch are treated with iodine and the requisite quantity of hydrogen, in the same manner as in Example 1. According to the degree of temperature and pressure employed and the duration of the reaction, there are formed, in addition to an abundance of ammonia, about 20% or more of liquid hydrocarbons boiling up to 200° C.; also about 30% or more of fractions of higher boiling point, and finally up to 20% or more of products of lubricating oil character.

The low-boiling substances can be used, like benzol or benzine, as motive power for internal-combustion engines. The higher fractions furnish very good Diesel-engine oils, while the fractions of highest boiling points find application as lubricating oil.

No difficulty is experienced in refining the several fractions by the methods known in the petroleum and coal tar industries; on the contrary it is effected in a very simple manner, with little loss, and in many cases can be omitted entirely.

The process may, of course, also be carried on in a continuous manner, or intermittently, and also by continuously distilling off the resulting light products with the gaseous products and unconsumed hydrogen, whilst the last named can be used again for the reaction after the condensable products have been deposited by cooling.

(3). 1 kilo of naphthalene and 1 gram of ammonium chloride are heated at about 470° C. for a short time in a suitable pressure vessel, fitted with stirrers and providing sufficient space for hydrogen admitted under a pressure of 100 atmospheres. According to the duration and temperature of the reaction, up to 70% and more of liquid hydrogenation products of naphthalene are obtained, including degradation products down to benzol.

(4). In the same manner as in Example 3, 500 grms. of ordinary coal-tar pitch are treated with ¼ grm. of potassium bromide and 1 grm. of iron alum. Up to 70% and over of constituents liquid at the ordinary temperature and boiling, in part, below 200° C., for the most part between 200° and 360° C., and in smaller amount above 360° C., are formed, the last named constituents being viscous and suitable for use as lubricating oils, whilst the lightest portions are best adapted for use as motive power in internal-combustion engines, and the medium fractions in Diesel-engines.

(5). 1 kilo of pulverized coal from seams of the most recent possible formation is treated with ½ grm. of potassium iodide, ½ grm. of potassium bromide, 1 grm. of potassium chloride and 1 grm. of ammonium chloride, in the manner described in Example 3. According to the duration and temperature of the reaction, 60% and over of liquid, distillable products are obtained, which can be satisfactorily refined by known methods and are also admirably adapted for use as motor fuel, lubricants, and many other purposes for which the distillates from petroleum or coal tar are employed.

(6). 500 grms. of the crude distillate from brown-coal tar or low-temperature coal tar are treated with ¼ grm. of potassium iodide, ½ grm. of ammonium chloride and ½ grm. of ferric chloride, as in Example 3. According to the temperature—which may lie between 200° and 500° C.—, pressure and duration of the reaction, products of benzine type are obtained which are admirably suitable for all the general purposes as the various grades of commercial benzine, especially the purest benzines and benzols.

The substances undergoing treatment may be classified as bituminous materials in each instance, employing the definition set forth by Abraham in his works such as that given in "Asphalt and Allied Substances," 3rd edition, (Van Nostrand), 1929, which is inclusive of various hydrocarbons and mixtures of hydrocarbons from whatever source and in varying degrees of purity, and of solid materials inclusive of lignites, coals, and the like; and in the following claims, the expression "bituminous material" is employed generally as covering the hydrocarbon and allied carbonaceous materials so defined.

What we claim is:—

1. The process for hydrogenating and splitting bituminous material, which comprises bringing a hydrogen-bearing gas, the material and elemental halogen having the catalytic properties of iodine into contact with one another in the presence of a metallic surface having the effect of iron, and effecting a reaction therebetween at a pressure above 50 atmospheres and at a temperature above 200 degrees C.

2. A process of preparing lower boiling hydrocarbons including benzols and benzines from higher boiling hydrocarbons which comprises bringing the higher boiling hydrocarbons into contact with hydro-bearing gas while maintaining a pressure above 50 atmospheres and a temperature above 200 degrees C. in the presence of a metallic surface having the effect of iron and a quantity of active halogen having the catalytic properties of iodine, for hydrogenating and splitting higher boiling hydrocarbon.

3. A process of preparing low-boiling hydrocarbons from higher boiling hydrocarbons which comprises preparing a fluid mixture of the higher boiling hydrocarbon and a hydrogen-bearing gas and less than one per cent of an elemental halogen having the catalytic properties of iodine, and continuously passing the mixture in contact with a metallic surface having the effect of iron while maintaining a pressure above 50 atmospheres and a temperature above 200 degrees C.

4. A process of hydrogenating and splitting tarry and pitchy material which comprises introducing a gas bearing free gaseous hydrogen into contact with the material, and effecting a reaction therebetween at a pressure above 50 atmospheres and at a temperature above 200 degrees C. in the presence of material capable of liberating at least one active elemental halogen and in the presence of a metallic surface having the effect of iron.

5. In a process of hydrogenating and splitting a bituminous material, the steps of mixing the material in the liquid phase with a small quantity of iodine and with a hydrogen-bearing gas, and then heating the mixture to a temperature of above 200 degrees C. and under a pressure above 50 atmospheres in the presence of a metallic surface having the effect of iron.

6. A process of preparing lower boiling hydrocarbons including benzols and benzines from higher boiling hydrocarbons, which comprises bringing the higher boiling hydrocarbons into contact with hydrogen-bearing gas while maintaining a pressure above 50 atmospheres and a temperature above 200 degrees C. in the presence of a metallic surface having the effect of iron and active iodine, for hydrogenating and splitting higher boiling hydrocarbons.

7. The process for hydrogenating and splitting bituminous material, which comprises bringing a hydrogen-bearing gas, the material and elemental iodine into contact with one another in the presence of an iron-bearing metallic surface and effecting a reaction therebetween at a pressure above 50 atmospheres and at a temperature above 200 degrees C.

8. A process of preparing lower boiling hydrocarbons from a bituminous material, which comprises introducing a mixture of the material and a hydrogen-bearing gas into contact with a metallic surface having the effect of iron, at a temperature of approximately 470 degrees C. while maintaining a pressure above 50 atmospheres in the presence of active halogen having the catalytic property of iodine, for hydrogenating and splitting higher boiling hydrocarbons in said material.

9. A process of preparing lower boiling hydrocarbons from a sulphur-containing mixture of high boiling bituminous materials, which comprises introducing a mixture of the material and a hydrogen-bearing gas into contact with a metallic surface having the effect of iron, at a temperature of approximately 470 degrees C. while maintaining a pressure above 50 atmospheres in the presence of active halogen having the catalytic property of iodine, for hydrogenating and splitting higher boiling hydrocarbons in said material.

10. A process of preparing lower boiling hydrocarbons from a higher boiling bituminous material which comrpises bringing the bituminous material into contact with a hydrogen-bearing gas at a temperature of approximately 470 degrees C. while maintaining a pressure above 50 atmospheres in the presence of elemental iodine and in the presence of an iron-bearing metallic surface.

11. A process of preparing lower boiling hydrocarbons from a mixture of higher boiling bituminous materials, which comprises introducing a mixture of the material and a hydrogen-bearing gas at a temperature of approximately 470 degrees C. while maintaining a pressure of above 50 atmospheres, into contact with a metallic surface having the effect of iron and in the presence of a metal halide which dissociates with difficulty at the temperature of the reaction and at least one metal salt which will facilitate the dissociation of the metal halide whereby to cause the liberation of active elemental halogen, for hydrogenating and splitting higher boiling hydrocarbons in said material.

12. A process of hydrogenating and splitting bituminous and like coals which comprises introducing a hydrogen-bearing gas into contact with the coal, and effecting a reaction therebetween at a pressure above 50 atmospheres and at a temperature above 200 degrees C. in the presence of at least one active elemental halogen and in the presence of a metallic surface having the effect of iron.

13. A process of hydrogenating and splitting bituminous and like coals which comprises introducing a hydrogen-bearing gas into contact with the coal, and effecting a reaction therebetween at a pressure above 50 atmospheres and at a temperature above 200 degrees C. in the presence of at least one metal-halogen compound and of a metal salt which facilitates the dissociation of the metal-halogen compound whereby to cause the liberation of elemental halogen for action as a catalyst, and in the presence of a metallic surface having the effect of iron.

14. A process for hydrogenating and splitting bituminous and like coals which comprises introducing a hydrogen-bearing gas into contact with the coal, and effecting a reaction therebetween at a pressure above 50 atmospheres and at a temperature above 200 degrees C. in the presence of elemental iodine and an iron-bearing metallic surface.

In testimony whereof we hereunto affix our signatures.

ADOLF SPILKER.
CARL ZERBE.